United States Patent
Liang et al.

(10) Patent No.: US 12,136,362 B1
(45) Date of Patent: Nov. 5, 2024

(54) POSITIONING METHOD FOR ELECTRONIC SHELF LABEL, COMPUTER DEVICE, AND STORAGE MEDIUM

(71) Applicant: HANSHOW TECHNOLOGY CO., LTD., Jiaxing (CN)

(72) Inventors: Min Liang, Jiaxing (CN); Yaping Ji, Jiaxing (CN); Sicheng Yu, Jiaxing (CN)

(73) Assignee: HANSHOW TECHNOLOGY CO., LTD., Jiaxing (CN)

(*) Notice: Subject to any disclaimer, the term of this patent is extended or adjusted under 35 U.S.C. 154(b) by 0 days.

(21) Appl. No.: 18/632,232

(22) Filed: Apr. 10, 2024

(30) Foreign Application Priority Data

Aug. 24, 2023 (CN) .......................... 202311075762.3

(51) Int. Cl.
  *G01S 5/00* (2006.01)
  *G09F 3/20* (2006.01)
(52) U.S. Cl.
  CPC ............ *G09F 3/208* (2013.01); *G01S 5/0036* (2013.01)
(58) Field of Classification Search
  CPC .................................................... G01S 5/0036
  See application file for complete search history.

(56) References Cited

U.S. PATENT DOCUMENTS

| | | | |
|---|---|---|---|
| 6,011,487 A * | 1/2000 | Plocher ................. | G01S 13/878 340/8.1 |
| 8,233,457 B1 * | 7/2012 | Chen ........................ | G01S 5/14 370/332 |
| 2002/0109593 A1 * | 8/2002 | Swartzel .............. | G06Q 10/087 340/572.1 |
| 2010/0246405 A1 | 9/2010 | Potkonjak | |
| 2011/0102144 A1 * | 5/2011 | Okina .................... | G06Q 30/02 340/5.91 |

(Continued)

FOREIGN PATENT DOCUMENTS

| CN | 102184436 A | 9/2011 |
|---|---|---|
| CN | 107064650 A | 8/2017 |

(Continued)

OTHER PUBLICATIONS

First CNOA with Search Report issued on Application No. 202311075762.3 dated Oct. 10, 2023, with English translation, (13p).

(Continued)

*Primary Examiner* — Barry W Taylor
(74) *Attorney, Agent, or Firm* — Arch & Lake LLP; Zhangyuan Ji

(57) ABSTRACT

A positioning method for an electrical shelf label, a computer device, and a non-transitory computer readable storage medium. The method includes: obtaining, by a server, a candidate electronic shelf label with a fuzzy positioning result; sequentially executing, by each of the candidate-matching shelf label pairs, a distance measurement task according to the distance measurement instruction to obtain a measured distance between the candidate electronic shelf label and each of the matching electronic shelf labels; revising, by the server, the fuzzy positioning result of the candidate electronic shelf label based on all the measured distances to determine an actual positioning result for the candidate electronic shelf label.

20 Claims, 10 Drawing Sheets

(56) References Cited

U.S. PATENT DOCUMENTS

2019/0094332 A1* 3/2019 Sackenreuter ............ G01S 5/14
2022/0141619 A1* 5/2022 Parikh .................. H04W 4/029
                                                         455/456.1

FOREIGN PATENT DOCUMENTS

| CN | 110636450 | A | 12/2019 |
| CN | 111885505 | A | 11/2020 |
| CN | 111901742 | A | 11/2020 |
| CN | 214040064 | U | 8/2021 |
| CN | 113950102 | A | 1/2022 |
| CN | 114494921 | A | 5/2022 |
| EP | 2887343 | A2 | 6/2015 |
| JP | 2015224898 | A | 12/2015 |
| JP | 2020165696 | A | 10/2020 |
| JP | 2023024064 | A | 2/2023 |
| WO | 2010021170 | A1 | 2/2010 |
| WO | 2017177599 | A1 | 10/2017 |
| WO | 2017202459 | A1 | 11/2017 |
| WO | 2019197716 | A1 | 10/2019 |
| WO | 2021003595 | A1 | 1/2021 |
| WO | 2021212303 | A1 | 10/2021 |
| WO | 2022179443 | A1 | 9/2022 |

OTHER PUBLICATIONS

Chunxue Wu, et al., "WSN Energy-Saving Research of Integrating RFID," Computer Systems and Applications, 2012,21(6):219-224,239, Nov. 5, 2011, (7p).

Wenxuan Huang, et al., "Research on RFID Train Location under Incomplete GPS," Railway Signalling and Communication Engineering, 2018,15(01):25-29, (5p).

JP Office Action issued in JP Application No. 2024-98836 dated Jul. 30, 2024 (2p).

* cited by examiner

POSITIONING METHOD FOR ELECTRONIC SHELF LABEL, COMPUTER DEVICE, AND STORAGE MEDIUM

CROSS-REFERENCE TO RELATED APPLICATIONS

This application is based upon and claims priority to Chinese Patent Application No. 202311075762.3, filed on Aug. 24, 2023, the entire disclosures of which are incorporated herein by reference in their entireties for all purposes.

TECHNICAL FIELD

The present disclosure relates to the technical field of positioning, in particular to a positioning method for an electronic shelf label, a computer device, and a storage medium.

BACKGROUND

At present, large supermarkets in the world are doing digital upgrading. In digital applications, electronic shelf labels replace the traditional paper labels. In addition to displaying ordinary information, electronic shelf labels can also be used in many applications, such as rapid picking, out of stock management, rapid inventory, human-computer interaction with users, etc. Since each electronic shelf label is bound to a certain kind of commodity, positioning the electronic shelf label is equivalent to positioning the commodity, which has a very practical value for application scenarios such as rapid picking, finding commodities and replenishment.

At present, the AOA (Angle-of-Arrival) positioning technology is usually adopted for the positioning of electronic shelf labels, and in order to cover the positioning of all electronic shelf labels in a supermarket, a large number of AOA base stations need to be deployed, which leads to problems of complex installation and high cost. Moreover, due to the high density of electronic shelf labels on the same shelf in both horizontal direction and vertical direction, the positioning technology based on AOA has the problem of high positioning errors.

It can be seen that the positioning method for an electronic shelf label in the prior art has the problems of high positioning cost and low positioning accuracy.

SUMMARY

In a first aspect, the present disclosure provides a positioning method for an electronic shelf label. The method may be applied in a server and include: calculating a positioning result for each position-unknown electronic shelf label by using coordinate information of position-known electronic shelf labels and obtaining a candidate electronic shelf label with a fuzzy positioning result and a plurality of matching electronic shelf labels that match with the candidate electronic shelf label, based on a neighbor weight table of all shelf labels in a same store, wherein the plurality of matching electronic shelf labels comprise neighboring shelf labels of the candidate electronic shelf label, wherein the neighboring shelf labels have known positions and are located on different shelves or in different rows; pairing the candidate electronic shelf label respectively with the plurality of matching electronic shelf labels to obtain a plurality of candidate-matching shelf label pairs, where each candidate-matching shelf label pair sequentially executes a distance measurement task to obtain a measured distance between the candidate electronic shelf label and each matching electronic shelf label; and determining an actual positioning result for the candidate electronic shelf label by revising the fuzzy positioning result of the candidate electronic shelf label based on all measured distances.

In a second aspect, the present disclosure provides computer device, including a memory, a processor, and a computer program stored on the memory and capable of running on the processor, the following steps being implemented upon execution of the computer program by the processor: calculating a positioning result for each position-unknown electronic shelf label by using coordinate information of position-known electronic shelf labels and obtaining a candidate electronic shelf label with a fuzzy positioning result and a plurality of matching electronic shelf labels that match with the candidate electronic shelf label, based on a neighbor weight table of all shelf labels in a same store, wherein the plurality of matching electronic shelf labels comprise neighboring shelf labels of the candidate electronic shelf label, wherein the neighboring shelf labels have known positions and are located on different shelves or in different rows; pairing the candidate electronic shelf label respectively with the plurality of matching electronic shelf labels to obtain a plurality of candidate-matching shelf label pairs, where each candidate-matching shelf label pair sequentially executes a distance measurement task to obtain a measured distance between the candidate electronic shelf label and each matching electronic shelf label; and determining an actual positioning result for the candidate electronic shelf label by revising the fuzzy positioning result of the candidate electronic shelf label based on all measured distances.

In a third aspect, the present disclosure provides a non-transitory computer readable storage medium storing a plurality of programs for execution by a computer device having a processor, wherein the plurality of programs, when executed by the processor, cause the computer device to perform acts including: calculating a positioning result for each position-unknown electronic shelf label by using coordinate information of position-known electronic shelf labels and obtaining a candidate electronic shelf label with a fuzzy positioning result and a plurality of matching electronic shelf labels that match with the candidate electronic shelf label, based on a neighbor weight table of all shelf labels in a same store, wherein the plurality of matching electronic shelf labels comprise neighboring shelf labels of the candidate electronic shelf label, wherein the neighboring shelf labels have known positions and are located on different shelves or in different rows; pairing the candidate electronic shelf label respectively with the plurality of matching electronic shelf labels to obtain a plurality of candidate-matching shelf label pairs, where each candidate-matching shelf label pair sequentially executes a distance measurement task to obtain a measured distance between the candidate electronic shelf label and each matching electronic shelf label; and determining an actual positioning result for the candidate electronic shelf label by revising the fuzzy positioning result of the candidate electronic shelf label based on all measured distances.

DETAILED DESCRIPTION

Figure 1:
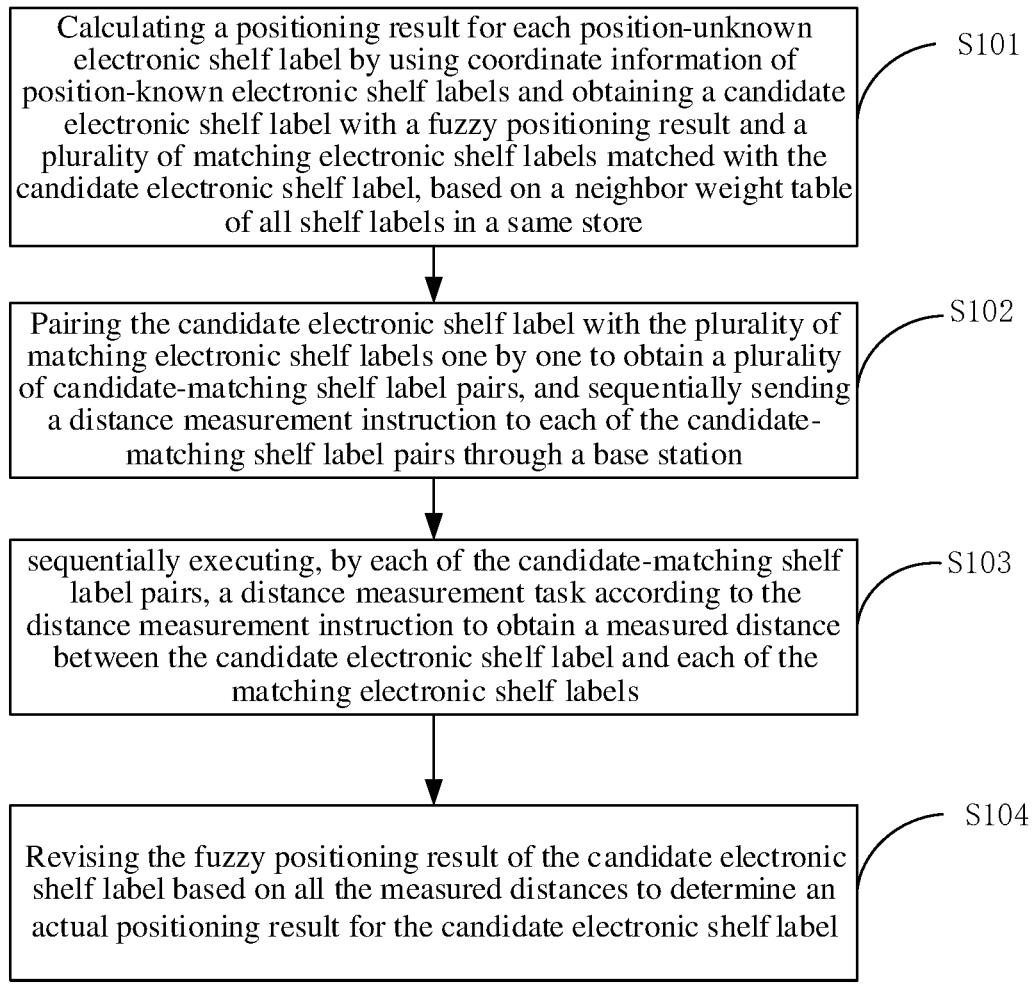
FIG. 1 is a flow diagram of a positioning method for an electronic shelf label according to a provided embodiment of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment," depending on the context.

In view of the deficiencies in the prior art, the present disclosure provides a positioning method for an electronic shelf label, computer device and non-transitory storage medium, which solve the problems of high positioning cost and low positioning accuracy existed in the electronic shelf label positioning methods in the prior art. The present disclosure determines the position of a position-unknown electronic shelf label by using the neighbor relationship between electronic shelf labels and the position-known electronic shelf labels, measures the distance between an electronic shelf label with an uncertain positioning result and a plurality of matching electronic shelf labels matched with it, and revises the uncertain positioning result based on the distance measurement results, thereby obtaining an actuate actual positioning result for the electronic shelf label. In this way, not only the positioning accuracy of the electronic shelf label is improved, but also the positioning complexity and positioning cost are reduced.

In a first aspect, the present disclosure provides a positioning method for an electronic shelf label, specifically including the following embodiments.

FIG. 1 is a flow diagram of a positioning method for an electronic shelf label according to a provided embodiment of the present disclosure. As shown in FIG. 1, the positioning method includes the following steps:

Step S101, calculating a positioning result for each position-unknown electronic shelf label by using coordinate information of position-known electronic shelf labels and obtaining a candidate electronic shelf label with a fuzzy positioning result and a plurality of matching electronic shelf labels matched with the candidate electronic shelf label, based on a neighbor weight table of all shelf labels in a same store. A position-unknown electronic shelf label may be an electronic shelf label with its position unknown. A position-known electronic shelf label may be an electronic shelf label with its position known.

Figure 2:
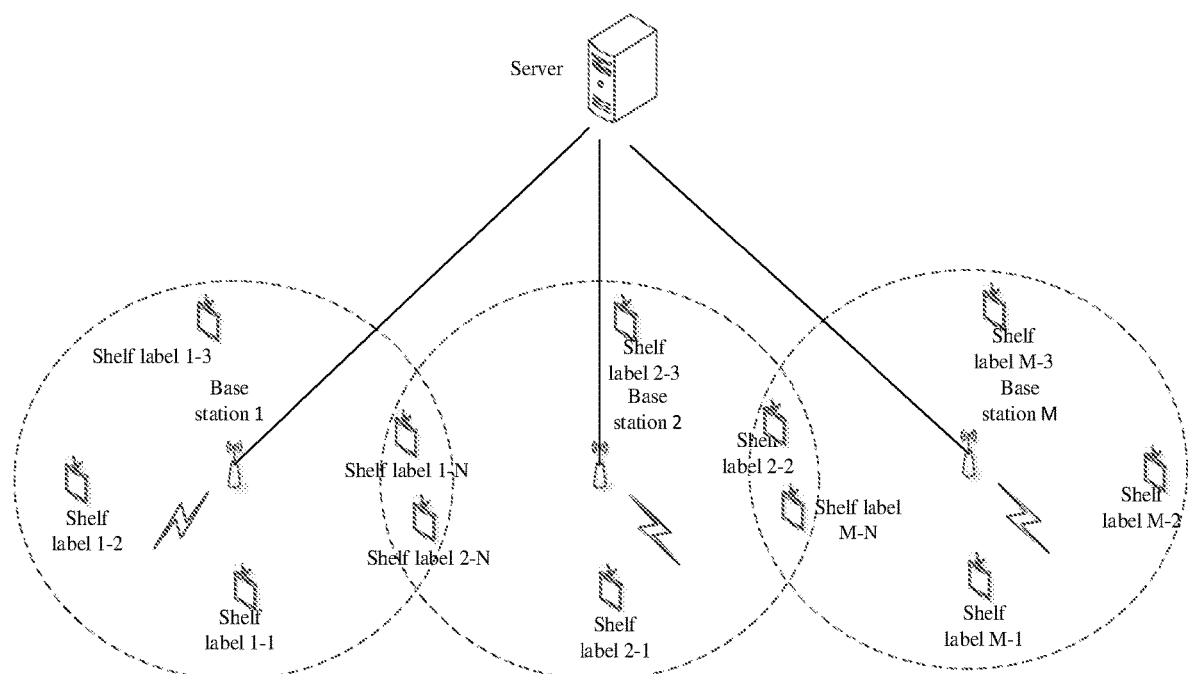
FIG. 2 is a structure diagram of an electronic shelf label system according to a provided embodiment of the present disclosure.

It should be noted that, as shown in FIG. 2, in this embodiment, the electronic shelf label system of each store includes a server, a plurality of base stations and a plurality of electronic shelf labels. The server sends control commands and service data to the electronic shelf labels through the base stations. The positioning principle of this embodiment is to determine a position-unknown electronic shelf label by using the position-known electronic shelf labels. Therefore, when the electronic shelf label system is deployed for the first time in a store, there needs to be the position-known electronic shelf labels, and the position-known electronic shelf label may be called a positioning anchor. With the neighbor weight table provided in this embodiment, the position of an electronic shelf label near a positioning anchor can be calculated, and similarly, the positioning coordinates of other position-unknown electronic shelf labels can be calculated by using the other position-known electronic shelf labels and the neighbor weight table. Next, detail illustration will be given on obtaining the neighbor weight table of all the shelf labels in a same store, on determining the positioning result of a position-unknown electronic shelf label based on the neighbor weight table, and on obtaining the candidate electronic shelf label with a fuzzy positioning result.

Figure 3:
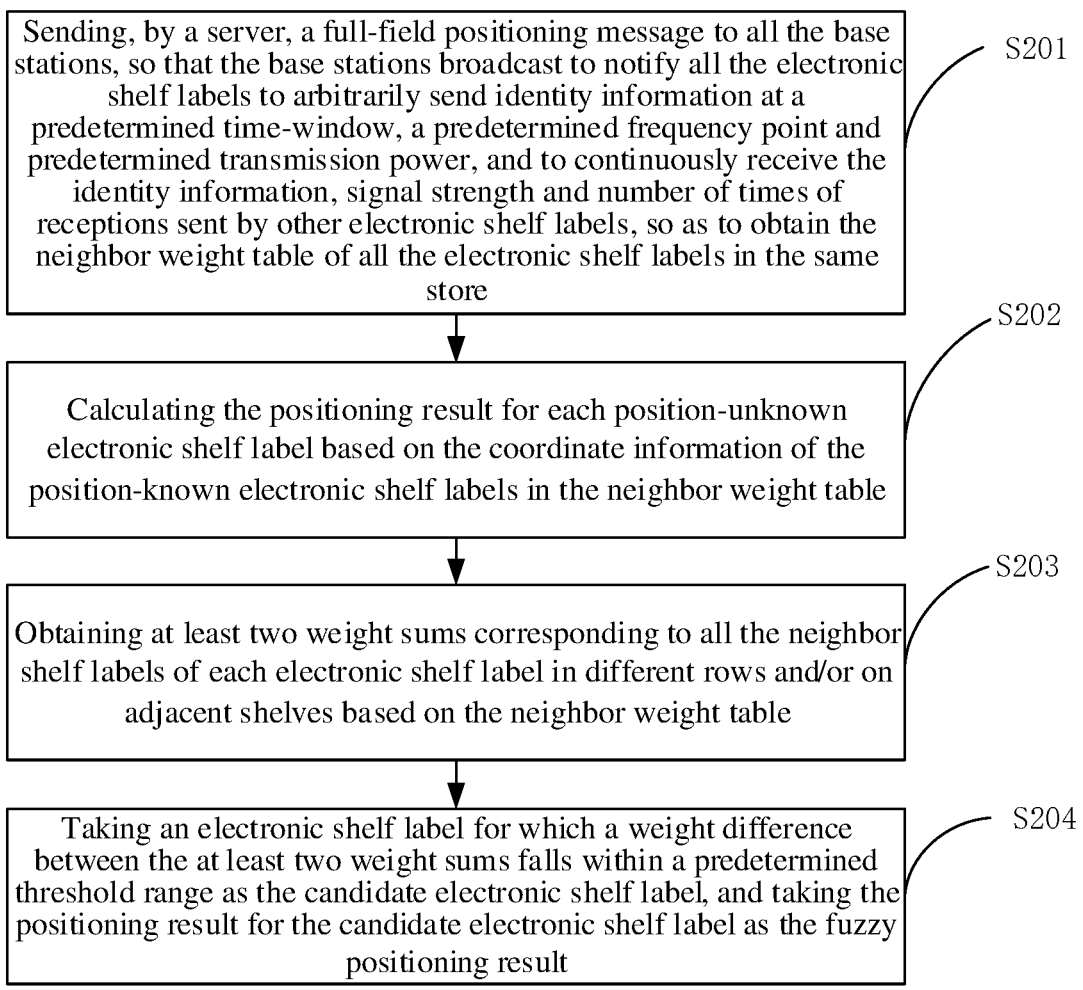
FIG. 3 is a specific flow diagram of step S101 in FIG. 1 according to a provided embodiment of the present disclosure.

As shown in FIG. 3, calculating a positioning result for each position-unknown electronic shelf label by using coordinate information of position-known electronic shelf labels and obtaining the candidate electronic shelf label with the fuzzy positioning result, based on the neighbor weight table of all shelf labels in the same store specifically includes the following steps:

Step S201, sending, by a server, a full-field positioning message to all the base stations, so that the base stations broadcast to notify all the electronic shelf labels to arbitrarily send identity information at a predetermined time-window, a predetermined frequency point and predetermined transmission power, and to continuously receive the identity information, signal strength and number of times of receptions sent by other electronic shelf labels, so as to obtain the neighbor weight table of all the electronic shelf labels in the same store.

It should be noted that the neighbor weight table includes the ID of the electronic shelf label, the ID of the neighbor electronic shelf label, and the neighbor weight of the neighbor electronic shelf label. The neighbor electronic shelf label not only refer to two electronic shelf labels adjacent in physical position, but may also refer to two electronic shelf labels which are not physically adjacent but can receive the identity information sent by each other. In addition, the neighbor weight may be the number of times that one electronic shelf label receives the identity information sent by another electronic shelf label within a limited time slice, may be the signal strength at which one electronic shelf label receives the identity information sent by another electronic shelf label within a limited time slice, and may also be a weighted average of the signal strength and the number of times that one electronic shelf label receives identity information sent by another electronic shelf label within a limited time slice.

Step S202, calculating the positioning result for each position-unknown electronic shelf label based on the coordinate information of the position-known electronic shelf labels in the neighbor weight table.

In this embodiment, calculating the positioning result for each position-unknown electronic shelf label by using the coordinate information of the position-known electronic shelf labels in the neighbor weight table specifically includes: constructing a network graph showing a communication relationship between all the position-unknown electronic shelf labels and the position-known electronic shelf labels based on the neighbor weight table; obtaining a path value between each position-unknown electronic shelf label and each position-known electronic shelf label based on the neighbor weights in the network graph; obtaining the positioning result for each position-unknown shelf label based on two smallest path values and coordinate information of two position-known electronic shelf labels corresponding to the two path values.

Figure 4:
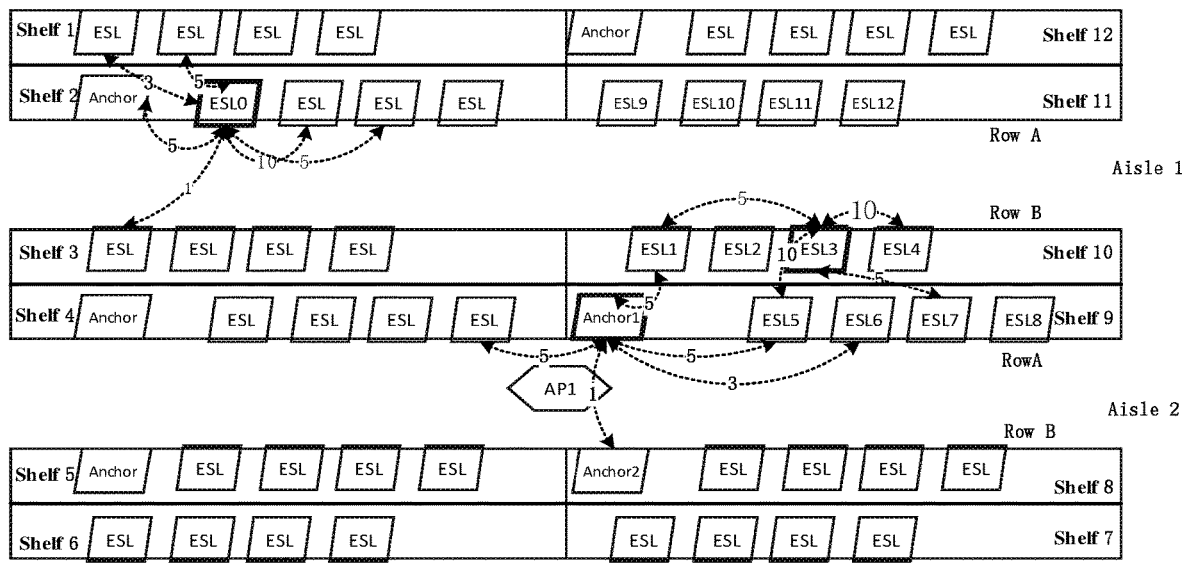
FIG. 4 is a diagram showing the neighbor relationship between electronic shelf labels according to a provided embodiment of the present disclosure.

It should be noted that, the constructed network graph showing a communication relationship between all the position-unknown electronic shelf labels and the position-known electronic shelf labels based on the neighbor weight table is shown in FIG. 4, taking the electronic shelf label ESL3 in FIG. 4 as an example, ESL1, ESL4, ESL5 and ESL7 are adjacent to ESL3 and their positions are known, and their corresponding neighbor weights are 5, 10, 10 and 5, respectively. In addition, when one electronic shelf label and another specific electronic shelf label are neighbor shelf labels of each other, the corresponding neighbor weights may or may not be the same. For example, when ESL4 in FIG. 4 is a neighbor shelf label of ESL3, its corresponding neighbor weight is 10; when ESL3 in FIG. 4 is a neighbor shelf label of ESL4, its corresponding neighbor weight may or may not be 10. For the convenience of illustration and calculation, this embodiment takes as an example the situation where the corresponding neighbor weights are the same when two electronic shelf labels are neighbor shelf labels of each other.

In this embodiment, the path value between two adjacent electronic shelf labels=(1/(a neighbor weight of a second electronic shelf label received by a first electronic shelf label+a neighbor weight of the first electronic shelf label received by the second electronic shelf label)). Accordingly, it can be calculated that the path values from the electronic shelf label ESL3 to ESL1, ESL4, ESL5 and ESL7 are respectively 0.1, 0.05, 0.05 and 0.1, based on the neighbor weights in the network graph. The path values are sorted from smallest to largest, and the first two path values are obtained as the two smallest path values. In FIG. 4, the two smallest path values are both 0.05, and the corresponding two position-known electronic shelf labels are ESL4 and ESL5. It should be noted that in the network graph, the connection of a position-unknown shelf label to a position-known shelf label may be realized by single-hop or by multi-hop, and the path value of multi-hop is the path value of the shortest path selected from a plurality of possible multi-hop paths. In this embodiment, single-hop means that a position-unknown shelf label and a position-known shelf label are in a direct neighbor weight relationship, for example, in FIG. 4, there is single-hop between ESL3 and ESL1 and single-hop between ESL3 and ESL4, but there is multi-hop between ESL3 and Anchor 1. ESL3 may reach Anchor 1 through ESL5, and ESL3 may also reach Anchor 1 through ELS1. Thus, the path value between ESL3 and Anchor 1 is the minimum value of the path values of the path ESL3-ESL1-Anchor1 and path ESL3-ESL5-Anchor1. The path value of a multi-hop is the sum of the path value of each single-hop:

$$A_{all} = \sum_i^I A_i,$$

where $A_{all}$ represents the overall path value between two shelf labels with multi-hop, $A_i$ represents each path value of single-hop included between the two shelf labels with multi-hop, i=[1, . . . I], I represents the total number of hops between the two shelf labels with multi-hop; for example, the path value of the multi-hop path ESL3-ESL1-Anchor1 equals to the path value of the single-hop from ESL3 to ESL1 plus the path value of the single-hop from ESL1 to Anchor1.

In this embodiment, obtaining the positioning result for each position-unknown shelf label based on two smallest path values and coordinate information of two position-known electronic shelf labels corresponding to the two path values includes: obtaining a weighted average value of the two smallest path values; adding the horizontal coordinates of the two position-known electronic shelf labels and multiplying a sum by the weighted average value to obtain the horizontal coordinate of the corresponding position-unknown electronic shelf label, and similarly, adding the vertical coordinates of the two position-known electronic shelf labels and multiplying a sum by the weighted average value to obtain the vertical coordinate of the corresponding position-unknown electronic shelf label.

Step S203, obtaining at least two weight sums corresponding to all the neighbor shelf labels of each electronic shelf label in different rows and/or on adjacent shelves based on the neighbor weight table.

In this embodiment, different rows refer to two shelf faces corresponding to a same aisle. For example, in FIG. 4, aisle 1 corresponds to row A and row B, in which row A is composed of shelf 2 and shelf 11 and row B is composed of shelf 3 and shelf 10, and similarly, aisle 2 corresponds to row A and row B, in which row A is composed of shelf 4 and shelf 9 and row B is composed of shelf 5 and shelf 8. Adjacent shelves refer to shelves physically adjacent to each other. For example, in FIG. 4, shelf 10 is adjacent to shelf 9 and shelf 3.

In this embodiment, obtaining at least two weight sums corresponding to all the neighbor shelf labels of each electronic shelf label in different rows and/or on adjacent shelves based on the neighbor weight table is namely to obtain the weight sum corresponding to the neighbor electronic shelf labels of the same electronic shelf label in different rows and the weight sum corresponding to the neighbor electronic shelf labels of the same electronic shelf label on different shelves. Taking ESL3 in FIG. 4 as an example, the corresponding different rows are row A and row B corresponding to aisle 1, and the corresponding adjacent shelves include shelf 3, shelf 10 and shelf 9. Since there is no electronic shelf label that has a neighbor relationship with ESL3 in row A and on shelf 3, currently only the weight sums on shelf 10 and shelf 9 are calculated. The weight sum corresponding to shelf 10=5+10=15, and the weight sum corresponding to shelf 9=10+5=15.

Step S204, taking an electronic shelf label for which a weight difference between the at least two weight sums falls within a predetermined threshold range as the candidate electronic shelf label, and taking the positioning result for the candidate electronic shelf label as the fuzzy positioning result.

It should be noted that, the weight difference between the at least two weight sums falls within the predetermined threshold means that the values of the two weight sums are very close. Still taking ESL3 in FIG. 4 as an example, currently, it is calculated that the weight sum corresponding to shelf 10 is 15 and the weight sum corresponding to shelf 9 is also 15, that is, the weight sums corresponding to shelf 9 and shelf 10 are the same. When such a situation occurs, there is the problem that it cannot be determined whether ESL3 is on shelf 9 or on shelf 10. Although in FIG. 4 it is on shelf 10, in actual positioning it would be unclear which specific shelf ESL3 is on. So, when the weight sums corresponding to different rows or different shelves are similar, there is a need to further revise the positioning result of the electronic shelf label. The electronic shelf label for which the weight sums corresponding to different rows or different shelves are similar is called the candidate electronic shelf label, and the positioning result calculated by the method of Step S202 is called the fuzzy positioning result.

Figure 5:
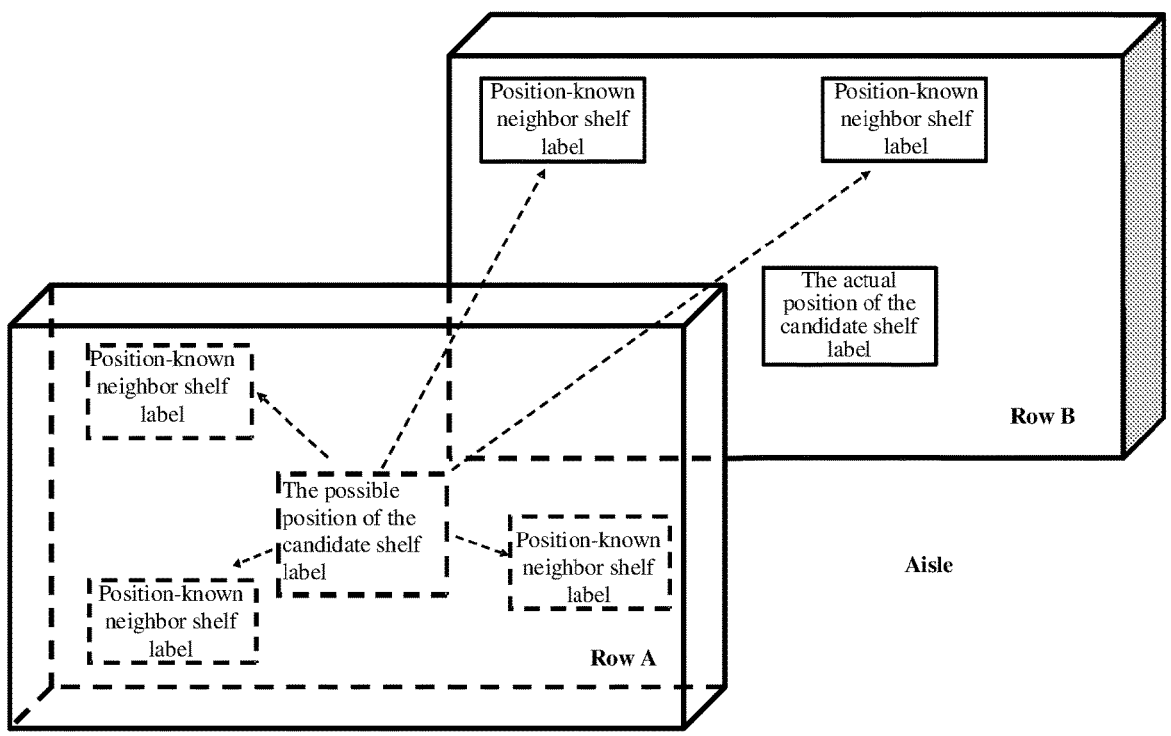
FIG. 5 is a diagram illustrating that a candidate shelf label may be positioned in different rows according to a provided embodiment of the present disclosure.
Figure 6:
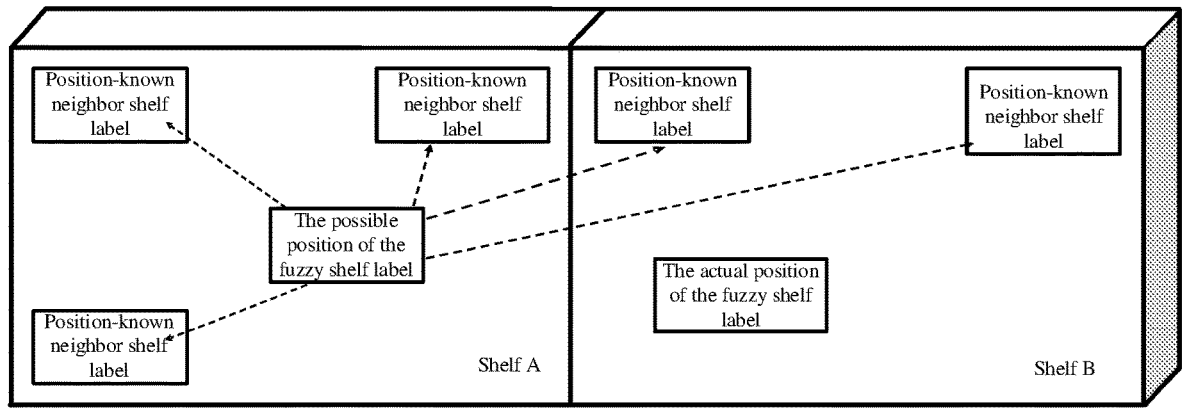
FIG. 6 is a diagram illustrating that a candidate shelf label may be positioned on different shelves according to a provided embodiment of the present disclosure.

FIG. 5 and FIG. 6 are respectively diagrams showing that the candidate shelf label may be positioned in different rows and on adjacent shelves.

After the candidate electronic shelf label is determined, a plurality of matching electronic shelf labels matched with the candidate electronic shelf label may be determined, in which the plurality of matching electronic shelf labels are position-known electronic shelf labels located on different shelves or/and in different rows in the neighbor shelf labels of the candidate electronic shelf label. Taking ESL3 in FIG. 4 as the candidate electronic shelf label, the plurality of matching electronic shelf labels corresponding to it are ESL1, ESL4, ESL5 and ESL7, the positions of them are known, and they are provided on different shelves.

Step S102, pairing the candidate electronic shelf label with the plurality of matching electronic shelf labels one by one to obtain a plurality of candidate-matching shelf label pairs, and sequentially sending a distance measurement instruction to each of the candidate-matching shelf label pairs through a base station.

It should be noted that pairing the candidate electronic shelf label with the plurality of matching electronic shelf labels one by one to obtain the plurality of candidate-matching shelf label pairs is namely to pair one candidate electronic shelf label with each of the matching electronic shelf labels to form one candidate-matching shelf label pair. For example, a candidate-matching shelf label pair formed from ESL3 and ESL1 candidate-matching, a candidate-matching shelf label pair formed from ESL3 and ESL4 candidate-matching, a candidate-matching shelf label pair formed from ESL3 and ESL5 candidate-matching, and a candidate-matching shelf label pair formed from ESL3 and ESL7 candidate-matching.

In this embodiment, sequentially sending the distance measurement instruction to each of the candidate-matching shelf label pairs through the base station includes: if the matching electronic shelf label in a current candidate-matching shelf label pair and the candidate electronic shelf label are registered in a same target base station, sending, by a server, the distance measurement instruction to the candidate electronic shelf label and the matching electronic shelf label at the same time through the target base station; and sending, by the server, the distance measurement instruction to the next candidate-matching shelf label pair, upon receiving the measured distance of the current candidate-matching shelf label pair.

In this embodiment, if the matching electronic shelf label in the current candidate-matching shelf label pair and the candidate electronic shelf label candidate-matching are registered in two different base stations, the server sends the distance measurement instruction to the candidate electronic shelf label and the matching electronic shelf label at the same time through the two base stations.

In this embodiment, the method further includes: if the matching electronic shelf label in the current candidate-matching shelf label pair and the candidate electronic shelf label are registered in two different base stations, sending, by the server, a re-registration instruction to the matching electronic shelf label, so that the matching electronic shelf label is re-registered to the target base station in which the candidate electronic shelf label is registered; and sending, by the server, the distance measurement instruction to the candidate electronic shelf label and the matching electronic shelf label at the same time through the target base station.

Figure 7:
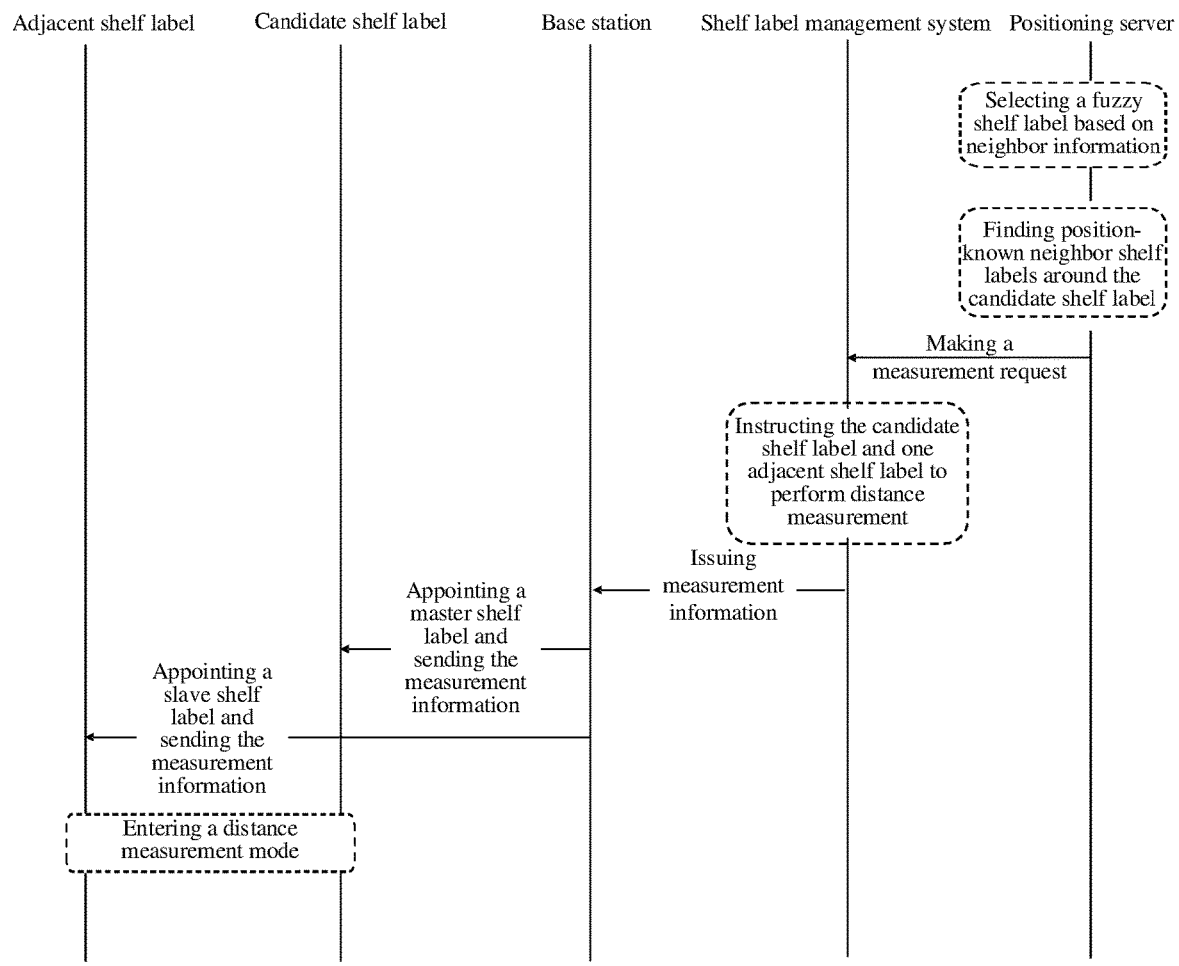
FIG. 7 is a flow diagram of issuing a distance measurement instruction according to a provided embodiment of the present disclosure.

It should be noted that, as shown in FIG. 7, the positioning server sends the selected candidate shelf label and the position-known shelf labels of the neighbors of the shelf label located in different rows together to a shelf label management system to request distance measurements for the pair or pairs of shelf labels. The shelf label management system judges and selects one or more pairs of shelf labels registered in the same base station from the candidate shelf label, and the neighbors for which distance measurement is needed, based on the shelf label registration information stored in the base station. As shown in FIG. 4, the candidate electronic shelf label ESL3 and neighbor electronic shelf labels ESL1, ESL4, ESL5 and ESL7 are all registered in base station AP1. Through this base station AP1, a distance measurement instruction is sent to the candidate shelf label and its neighbors at the same time to activate a distance measurement operation for these pairs of shelf labels. It should be further noted that in this embodiment, there are four candidate-matching shelf label pairs for ESL3. Base station AP1 sends the distance measurement instruction to the candidate electronic shelf label and the matching electronic shelf label in one of the candidate-matching shelf label pairs at the same time, and after the distance measurement for this candidate-matching shelf label pair is finished, it sends the distance measurement instruction to the candidate electronic shelf label and the matching electronic shelf label in the next candidate-matching shelf label pair at the same time.

Further, if the candidate electronic shelf label and the matching electronic shelf label are not registered in a same base station, namely, when ESL3 is registered in base station AP1 and ESL1 is registered in base station AP2, the instruction may be issued in two ways: in the first way, the distance measurement instruction is sent to the two shelf labels at the same time through the two base stations, and it is agreed in the issued distance measurement instructions to start the distance measurement task simultaneously at a certain time in the future; in the second way, there is a need to first issue a re-registration instruction to the neighbor shelf label to be measured, and starts to issue the distance measurement instruction after the neighbor shelf label is re-registered in the base station in which the candidate shelf label is registered.

In this embodiment, the issued distance measurement instruction should at least include the following information: the IDs of the two to-be-measured distance shelf labels; the identities of the two shelf labels (e.g., the candidate shelf label is a master shelf label and the neighbor shelf label is a slave shelf label); the distance measurement start time; the frequency point range for the distance measurement, the duration for a measurement signal transmission, the signal transmission power, the reception time-window length, the duration for a single measurement, and the number of times of measurement. After the selected pair of shelf labels receive this information completely, a distance measurement mode is entered, and the distance measurement process is stated based on the distance measurement start time.

Step S103, sequentially executing, by each of the candidate-matching shelf label pairs, a distance measurement task according to the distance measurement instruction to obtain a measured distance between the candidate electronic shelf label and each of the matching electronic shelf labels.

In this embodiment, sequentially executing, by each of the candidate-matching shelf label pairs, the distance measurement task according to the distance measurement instruction to obtain the measured distance between the candidate electronic shelf label and each of the matching electronic shelf labels includes: sending, by the candidate electronic shelf label in the current candidate-matching shelf label pair, an i-th measurement signal using a center-frequency point $f_i$, and recording, by the matching electronic shelf label in the current candidate-matching shelf label pair, a phase $\varphi_{Ri}$ of the received i-th measurement signal; carrying the phase $\varphi_{Ri}$ in an i-th response signal and sending the i-th response signal using the center-frequency point $f_i$, by the matching electronic shelf label in the current candidate-matching shelf label pair, and recording, by the candidate electronic shelf label in the current candidate-matching shelf label pair, a phase $\varphi_{Ti}$ of the received i-th response signal; when the candidate electronic shelf label records a phase $\varphi_{TN}$ of an N-th response signal sent by the matching electronic shelf label, calculating, by the candidate electronic shelf label, the measured distance between the candidate electronic shelf and the matching electronic shelf label in the current candidate-matching shelf label pair based on the center-frequency point $f_i$, the phase $\varphi_{Ri}$ and the phase $\varphi_{Ti}$, where, $f_i$ is an arithmetic progression, i=a positive integer of [1, 2, . . . , N], where N is a preset total number of times of measurement signal transmission.

Figure 8:
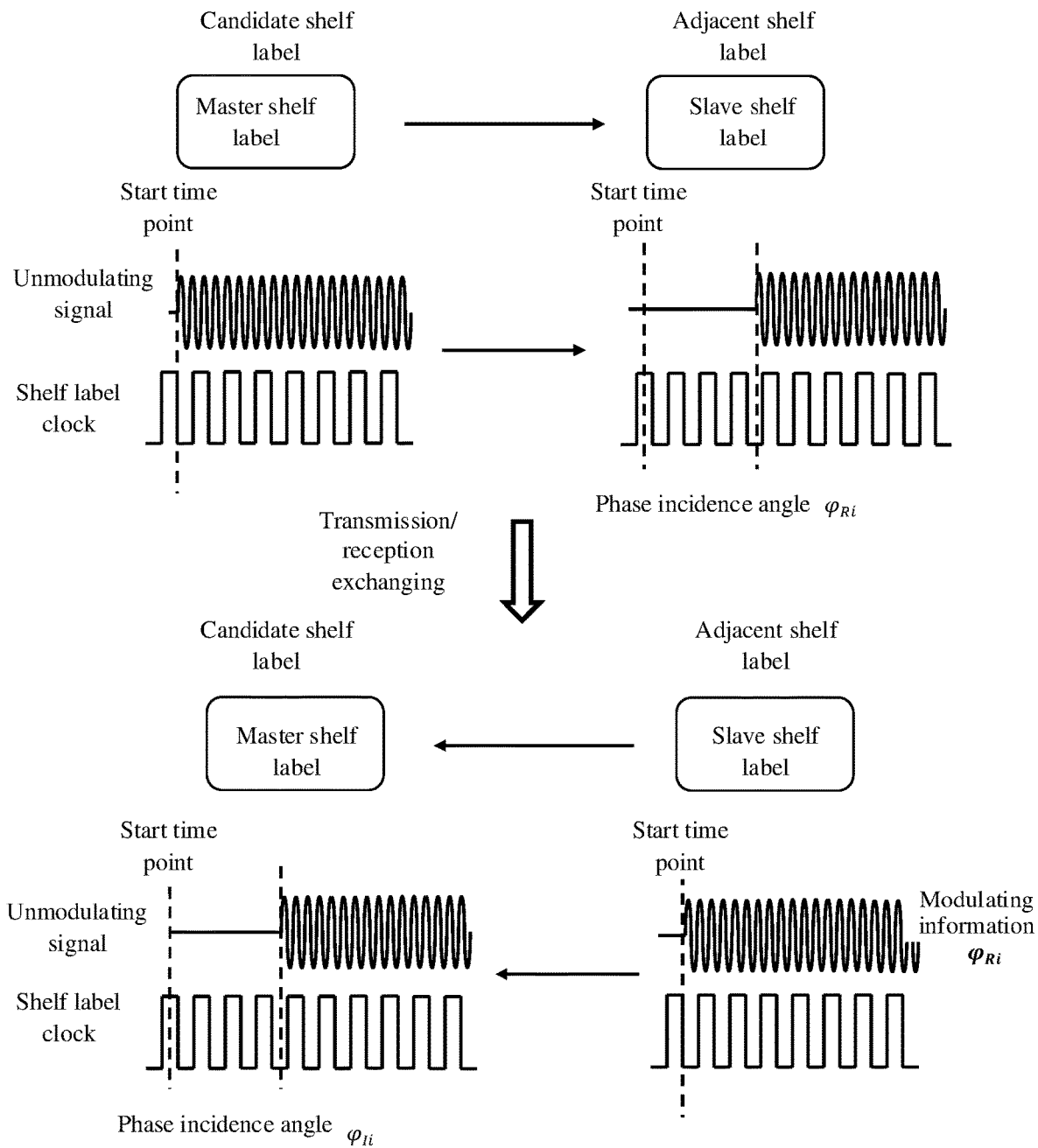
FIG. 8 is a diagram of an active reflection of measuring phase of the shelf label according to a provided embodiment of the present disclosure.
Figure 9:
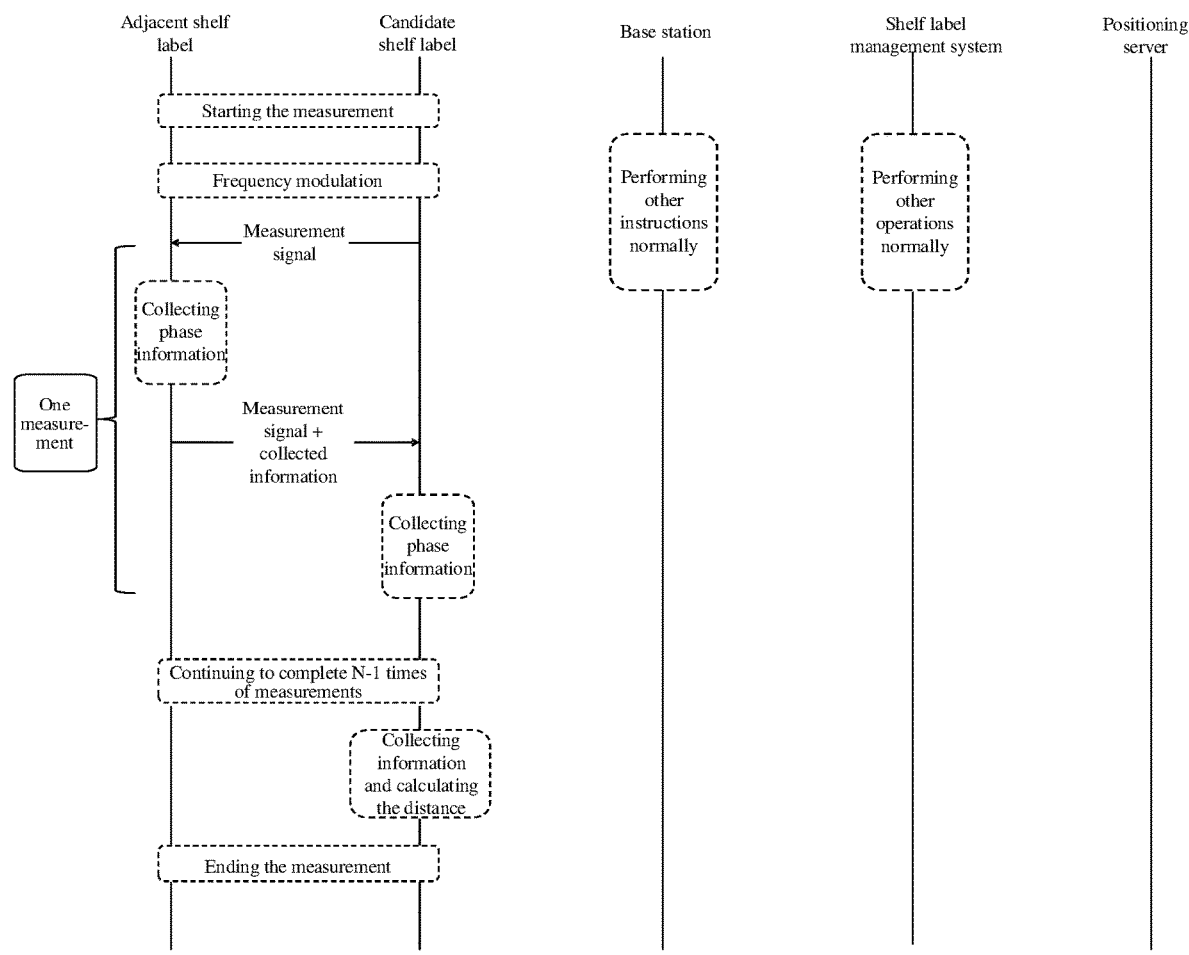
FIG. 9 is a flow diagram of controlling the distance measurement according to a provided embodiment of the present disclosure.

It should be noted that, measurement errors may be caused by incomplete synchronization of the clocks when the two shelf labels are communicating with each other for measuring distance. To avoid such measurement errors, this embodiment employs an active reflection measurement method: as shown in FIGS. 8 and 9, in one measurement, the frequency point for the measurement is set at first, then the measurement signal is sent by the master shelf label, and the slave shelf label receives it and measures and records the phase, and after that is completed, the slave shelf label sends the measurement signal carrying the previous phase measurement information, and the master shelf label receives the signal, measures the phase and records the transmitted measurement information. This process is a complete measurement. After the master shelf label sends the measurement signal, it enters a signal receiving state; after storing the measurement information, the slave shelf label waits based on the duration for a measurement signal transmission and enters a signal transmission state after the expiration of the duration. Two measurement results are subtracted to obtain the phase difference in this frequency point which is not affected by the clock inconsistency in the case of continuous measurements.

Figure 10:
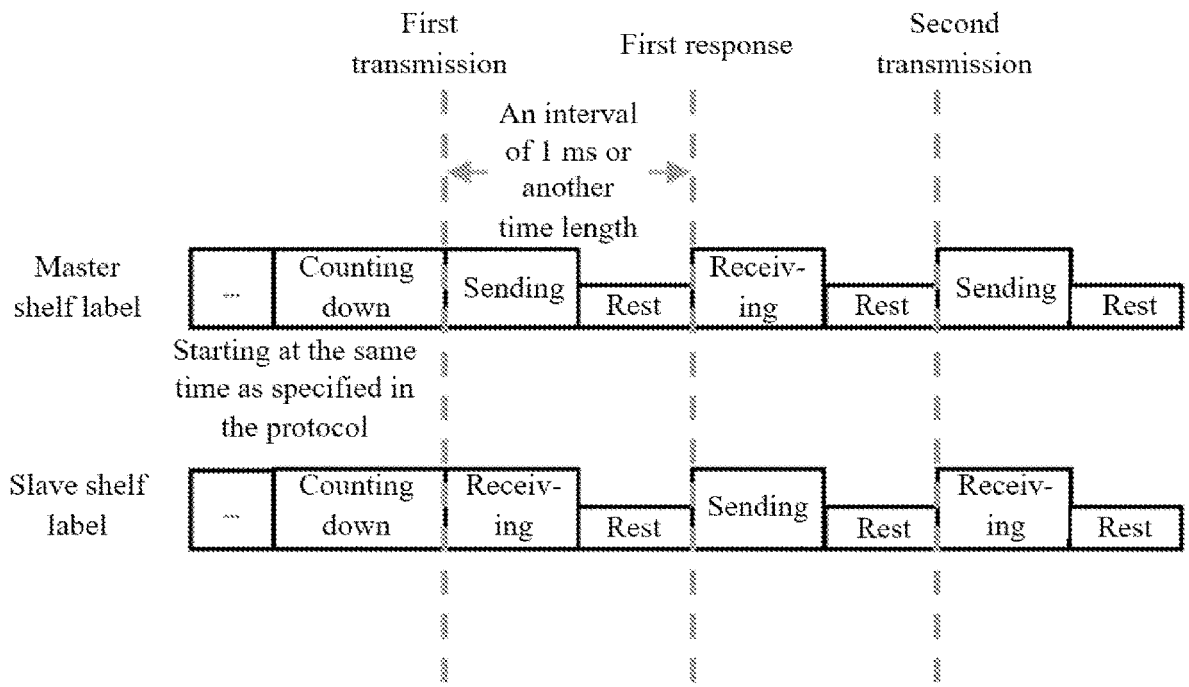
FIG. 10 is a time-sequence relationship diagram of sending and receiving signals between a master shelf label and a slave shelf label according to a provided embodiment of the present disclosure.

In this embodiment, the start time point of the master shelf label sending a signal and the start time point of the slave shelf label receiving the signal are strictly synchronized, and the slave shelf label may appropriately turn on the radio frequency in advance in order not to lose the signal and wait to receive the measurement signal; when the slave shelf label in turn responds to the measurement signal of the master shelf label and sends a response signal, it also starts to send the signal at the predetermined time point in accordance with the pre-designed protocol rules, and the master shelf label also starts to receive the signal at the corresponding time point, and similarly, the master shelf label may also turn on the radio frequency in advance and wait to receive the response signal. As shown in FIG. 10, the start time point of the master shelf label sending the i-th measurement signal is the same as the start time point of the slave shelf label receiving the i-th measurement signal, and the corresponding start time point of the slave shelf label sending the i-th response signal after an interval of 1 ms is the same as the start time point of the master shelf label receiving the i-th response signal. In this case, the clock and phase-locked loop of RF (Radio Frequency) are not turned off throughout the process in which the master shelf label or the slave shelf label turns from sending to receiving, and from $f_1$ to $f_2$ to $f_N$, and the clock and phase-locked loop are remained stable throughout the process.

After the specified number of times of measurements are completed, the two shelf labels stop the measurement mode. The candidate shale label (master shelf label) processes the data and calculates the distance. Also, the shelf label may report the measured values to the server, and the server calculates the distance; due to the errors in the measurement process, the data needs to be processed with special algorithms to minimize the impact by the errors. There are two main types of distance measurement algorithms: the first one is linear fitting, and the second one is feature extraction.

It should be noted that, for a complete measurement of a candidate-matching shelf label pair, the center-frequency point is $f_i$, the phase measured by the slave shelf label is $\varphi_{Ri}$, the phase measured by the master shelf label is $\varphi_{Ii}$, and the corresponding phase difference is $\varphi_i = \varphi_{Ii} - \varphi_{Ri}$. The relationship between $\varphi_i$ and $f_i$ can be obtained by multiple measurements at different frequency points.

In one embodiment, calculating, by the candidate electronic shelf label in the current candidate-matching shelf label pair, the measured distance between the candidate electronic shelf label and the matching electronic shelf label in the current candidate-matching shelf label pair based on the center-frequency point $f_i$, the phase $\varphi_{Ri}$ and the phase $\varphi_{Ii}$ includes: obtaining, by the candidate electronic shelf label in the current candidate-matching shelf label pair, a phase difference $\varphi_i$ based on the phase $\varphi_{Ri}$ and the phase $\varphi_{Ii}$; performing linear fitting of the phase difference $\varphi_i$ and the center-frequency point $f_i$ to obtain a slope of curve; and calculating the measured distance between the candidate electronic shelf label and the matching electronic shelf label in the current candidate-matching shelf label pair based on the slope of curve.

A formula for calculating the measured distance between the candidate electronic shelf label and the matching electronic shelf label in the current candidate-matching shelf label pair based on the slope of curve is:

$$d_1 = k\frac{c}{\pi}$$

where, $d_1$ is the measured distance between the candidate electronic shelf label and the matching electronic shelf label in the current candidate-matching shelf label pair, k represents the transmission delay corresponding to the air interface, and c is the speed of light; and in which there is an integer multiple relationship between k and the over-the-air transmission delay, and k may be the corresponding transmission delay obtained by dividing the slope of curve by the integer multiple relationship.

Figure 11:
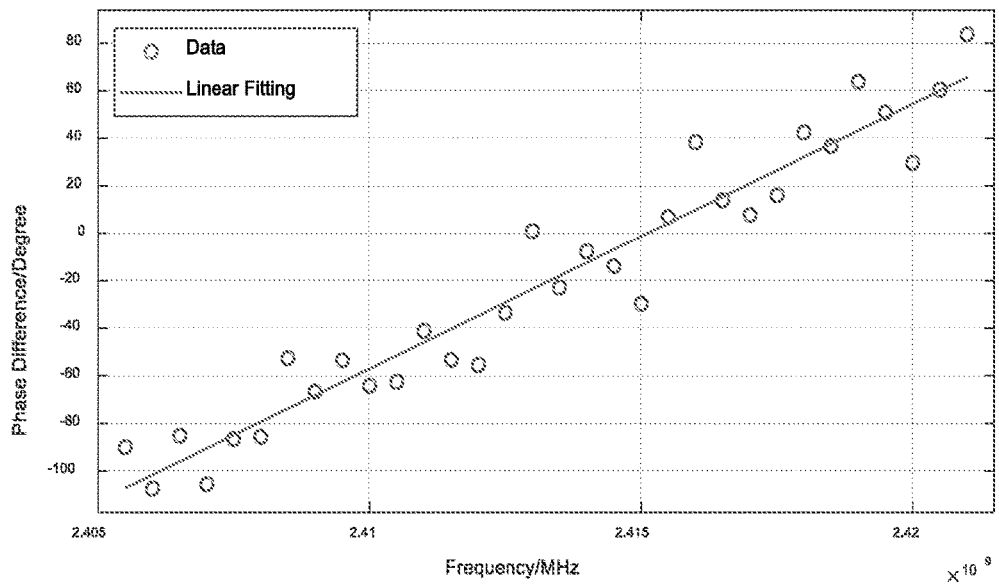
FIG. 11 is a diagram of linear fitting according to a provided embodiment of the present disclosure.

It should be noted that, as shown in FIG. 11, in this embodiment, linear fitting is performed for the relationship between $\varphi_i$ and $f_i$ to obtain the slope of curve, and the derivation process of the formula for calculating the measured distance between the two electronic shelf labels based on the slope of curve is as follows:

If it is assumed that the distance between ESL1 and ESL2 is $d_1$, c is the speed of light, $\pi$ is the ratio of the circumference of a circle to its diameter, and the signal transmission time is $$t = \frac{d_1}{c},$$

and that the clocks of the two devices are synchronized, when the frequency (frequency point) of the transmission signal is $f_i$, there exists $\varphi_i = 2\pi f_i t$, where $\varphi_i$ is the phase difference between the sent signal at the sending end and the received signal at the receiving end. Similarly, when the transmission signal frequency is $f_{i+1}$, there exists $\varphi_{i+1} = 2\pi f_{i+1} t$. Thus, $\Delta\varphi_i = \varphi_{i+1} - \varphi_i = 2\pi t(f_{i+1} - f_i)$, and it can be obtained that $$t = \frac{\varphi_{i+1} - \varphi_i}{2\pi(f_{i+1} - f_i)},$$

and therefore there exists $$d_1 = tc = \frac{(\varphi_{i+1} - \varphi_i)}{(f_{i+1} - f_i)}\frac{c}{2\pi} = \frac{\Delta\varphi_i}{\Delta f}\frac{c}{2\pi}$$

If it is assumed that the clocks of the two devices are not totally synchronized, $\varphi_i$ cannot be directly measured, and $\varphi_i = \varphi_{Ii} - \varphi_{Ri}$ under the frequency point $f_i$ by the active reflection method is obtained, and $\varphi_{i+1} = \varphi_{Ii+1} - \varphi_{Ri+1}$ is obtained under the frequency point $f_{i+1}$ by a likewise manner. Thus, there exists $\Delta\varphi_i = \varphi_{i+1} - \varphi_i = (\varphi_{Ii+1} - \varphi_{Ri+1}) - (\varphi_{Ii} - \varphi_{Ri})$. In fact, the $\Delta\varphi_i$ in the previous case is twice as much as in this case, and therefore there exists $$d_1 = tc = \frac{2\Delta\varphi_i}{\Delta f}\frac{c}{2\pi} = \frac{\Delta\varphi_i}{\Delta f}\frac{c}{\pi}$$

Assume that $$\frac{\Delta\varphi i}{\Delta f} = k,$$

then $$d_1 = k\frac{c}{\pi}.$$

In another embodiment, calculating, by the candidate electronic shelf label in the current candidate-matching shelf label pair, the measured distance between the candidate electronic shelf label and the matching electronic shelf label in the current candidate-matching shelf label pair based on the center-frequency point $f_i$, the phase $\varphi_{Ri}$ and the phase $\varphi_{Ii}$ includes: obtaining, by the candidate electronic shelf label in the current candidate-matching shelf label pair, a phase difference $\varphi_i$ based on the phase $\varphi_{Ri}$ and the phase $\varphi_{Ii}$; performing autocorrelation processing and fast Fourier transform on the phase difference $\varphi_i$ to extract a data coordinate $m(i_{max})$ corresponding to a maximum feature point; and calculating the measured distance between the candidate electronic shelf label and the matching electronic shelf label in the current candidate-matching shelf label pair based on the data coordinate.

A formula for calculating the measured distance between the candidate electronic shelf label and the matching electronic shelf label in the current candidate-matching shelf label pair based on the data coordinate is:

$$d_2 = d_{max} \cdot m(A_{max}) + d_{offset}$$

where, $d_2$ is the measured distance between the candidate electronic shelf label and the matching electronic shelf label in the current candidate-matching shelf label pair, $$d_{max} = \frac{c}{4\Delta f},$$

where $\Delta f$ is a difference between two adjacent frequency points, $d_{offset}$ is a distance error caused by the internal circuits of the shelf labels, and $m(A_{max})$ is a normalized value of the data coordinate $m(i_{max})$.

Figure 12:
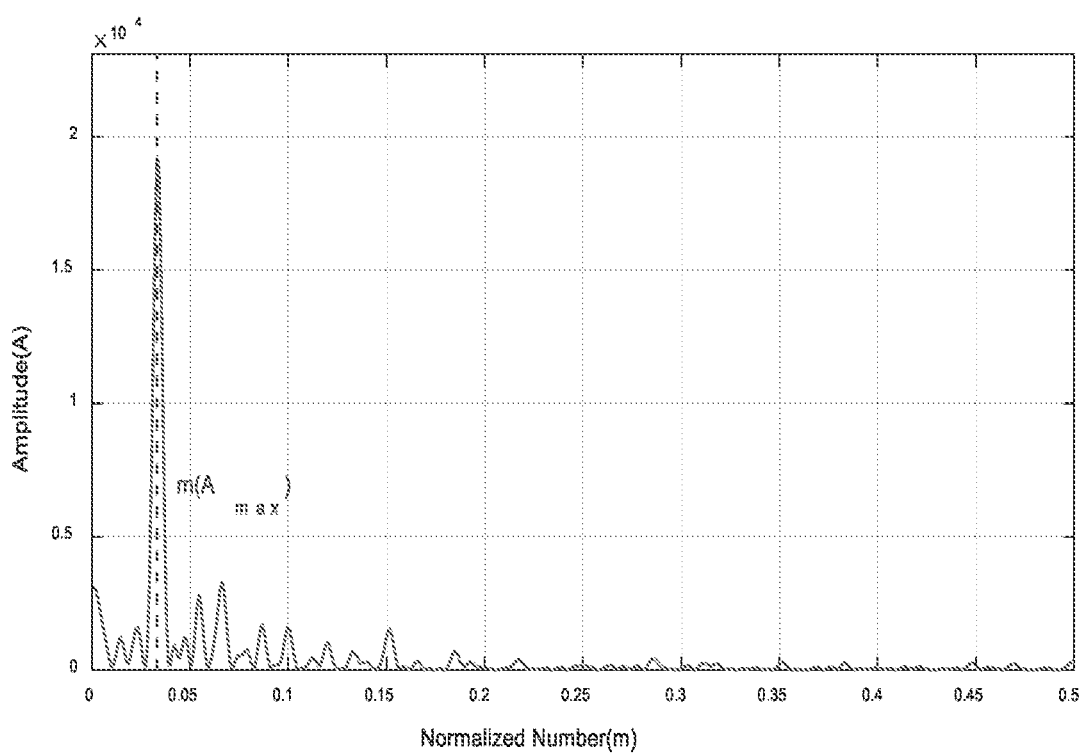
FIG. 12 is a feature diagram after autocorrelation and FFT transform of data sets according to a provided embodiment of the present disclosure.

It should be noted that, first the data set $\varphi_i$ is autocorrelated to highlight its change features, and then the features are extracted by fast Fourier transform; after that, the data coordinate $m(i_{max})$ corresponding to the maximum feature point (amplitude peak) of the transformed data set is found, and after the length of the data set is normalized ($m(A) \in [0,1]$), as shown in FIG. 12, the distance $d_2$ between the two shelf labels is calculated by the formula $d_2 = d_{max} \cdot m(A_{max}) + d_{offset}$, where, $$d_{max} = \frac{c}{4\Delta f},$$

where $\Delta f$ is a difference between two adjacent frequency points (by default the frequency difference between any two adjacent frequency points is the same), and $d_{offset}$ is a distance error caused by the internal circuits of the shelf labels.

Step S104, revising the fuzzy positioning result of the candidate electronic shelf label based on all the measured distances to determine an actual positioning result for the candidate electronic shelf label.

In one embodiment, revising the fuzzy positioning result of the candidate electronic shelf label based on all the measured distances to determine an actual positioning result for the candidate electronic shelf label includes: grouping the plurality of matching electronic shelf labels according to the same rows or/and the same shelves to obtain at least two electronic shelf label groups; obtaining a target electronic shelf label group with the smallest measured distance in the two electronic shelf label groups based on all the measured distances between the candidate electronic shelf label and all the matching electronic shelf labels; taking a row or/and a shelf corresponding to the target electronic shelf label group as a target row or/and a target shelf of the candidate electronic shelf label; and fusing the target row or/and the target shelf of the candidate electronic shelf label with the fuzzy positioning result to determine the actual positioning result for the candidate electronic shelf label.

In another embodiment, revising the fuzzy positioning result of the candidate electronic shelf label based on all the measured distances to determine an actual positioning result for the candidate electronic shelf label includes: grouping the plurality of matching electronic shelf labels according to the same rows or/and the same shelves to obtain at least two electronic shelf label groups; obtaining a target electronic shelf label group with the smallest average measured distance in the two electronic shelf label groups based on all the measured distances between the candidate electronic shelf label and all the matching electronic shelf labels; taking a row or/and a shelf corresponding to the target electronic shelf label group as a target row or/and a target shelf of the candidate electronic shelf label; and fusing the target row or/and the target shelf of the candidate electronic shelf label with the fuzzy positioning result to determine the actual positioning result for the candidate electronic shelf label.

Figure 13:
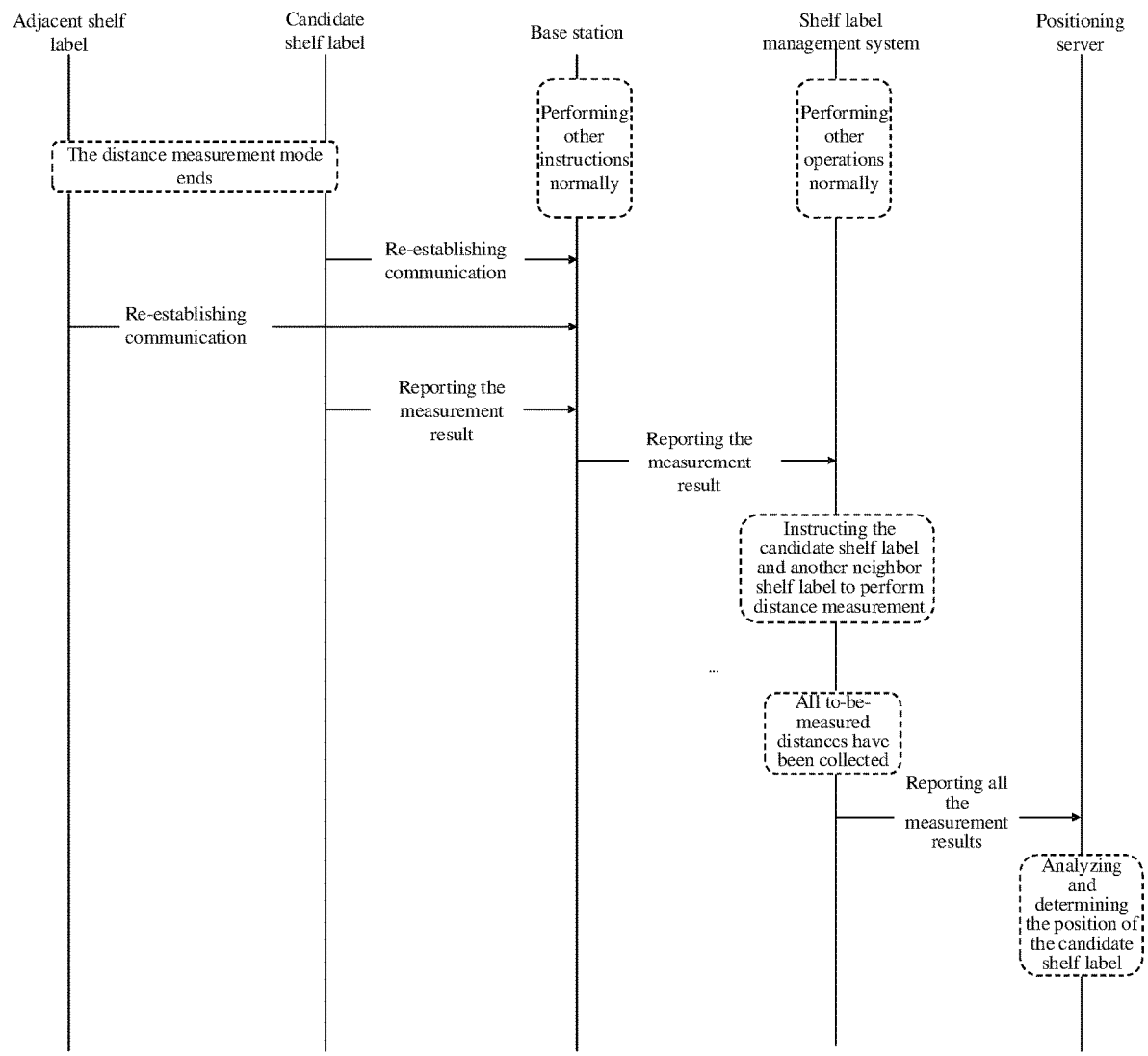
FIG. 13 is a diagram of reporting a distance measurement result according to a provided embodiment of the present disclosure.

It should be noted that, as shown in FIG. 13, after the shelf labels complete the distance measurement, they need to re-establish communication with the base station. After that, the shelf labels report the distance measurement result to the shelf label management system through the base station, and the shelf label management system then instructs the next group of shelf labels that meets the requirement to perform distance measurement. After all the required distance measurement tasks are completed, the management system reports all the distance measurement results to the positioning server.

Further, the positioning server revises the positioning result after collecting all the distance measurement results of the candidate shelf label. The distance measurement results are grouped based on the corresponding positions of the neighbor shelf labels. The measured distances corresponding to the shelf labels located in the same row are divided into the same group, and the measured distances corresponding to the shelf labels located on the same shelf are divided into the same group. There are two revision methods: one is to compare the minimum values of the two groups of results, and the row or shelf corresponding to the group with a smaller minimum value is determined as the actual row or shelf of the candidate shelf label; the other is to compare the average values of the two groups of results, and the row or shelf corresponding to the group with a smaller average value is determined as the actual row or shelf of the candidate shelf label.

Compared with the prior art, the present disclosure has the following advantageous effects:

1. The present disclosure determines the position of a position-unknown electronic shelf label by using the neighbor relationship between the electronic shelf labels and the position-known electronic shelf labels, and may realize the positioning of the electronic shelf label without changing the original number of communication base stations of the electronic shelf label system, and therefore not only the positioning accuracy of the electronic shelf label is improved, but also the positioning complexity and positioning cost are reduced.
2. The present disclosure carries out distance measurement for an electronic shelf label with an uncertain positioning result and a plurality of matching electronic shelf labels matched with it, and revises the uncertain positioning result based on the distance measurement results, so as to obtain the actual positioning result for the electronic shelf label, and further improves the positioning accuracy of the electronic shelf label.

In a second aspect, the present disclosure provides computer device, including a memory, a processor, and a computer program stored on the memory and capable of running on the processor, the following steps being implemented upon execution of the computer program by the processor: calculating a positioning result for each position-unknown electronic shelf label by using coordinate information of position-known electronic shelf labels and obtaining a candidate electronic shelf label with a fuzzy positioning result and a plurality of matching electronic shelf labels matched with the candidate electronic shelf label, based on a neighbor weight table of all shelf labels in a same store, and the plurality of matching electronic shelf labels are position-known electronic shelf labels located on different shelves or/and in different rows in the neighbor shelf labels of the candidate electronic shelf label; pairing the candidate electronic shelf label with the plurality of matching electronic shelf labels one by one to obtain a plurality of candidate-matching shelf label pairs, and sequentially sending a distance measurement instruction to each of the candidate-matching shelf label pairs through a base station; sequentially executing, by each of the candidate-matching shelf label pairs, a distance measurement task according to the distance measurement instruction to obtain a measured distance between the candidate electronic shelf label and each of the matching electronic shelf labels; and revising the fuzzy positioning result of the candidate electronic shelf label based on all the measured distances to determine an actual positioning result for the candidate electronic shelf label.

In a third aspect, the present disclosure provides a non-transitory readable storage medium on which a computer program is stored, the following steps being implemented upon execution of the computer program by a processor: calculating a positioning result for each position-unknown electronic shelf label by using coordinate information of position-known electronic shelf labels and obtaining a candidate electronic shelf label with a fuzzy positioning result and a plurality of matching electronic shelf labels matched with the candidate electronic shelf label, based on a neighbor weight table of all shelf labels in a same store, and the plurality of matching electronic shelf labels are position-known electronic shelf labels located on different shelves or/and in different rows in the neighbor shelf labels of the candidate electronic shelf label; pairing the candidate electronic shelf label with the plurality of matching electronic shelf labels one by one to obtain a plurality of candidate-matching shelf label pairs, and sequentially sending a distance measurement instruction to each of the candidate-matching shelf label pairs through a base station; sequentially executing, by each of the candidate-matching shelf label pairs, a distance measurement task according to the distance measurement instruction to obtain a measured distance between the candidate electronic shelf label and each of the matching electronic shelf labels; and revising the fuzzy positioning result of the candidate electronic shelf label based on all the measured distances to determine an actual positioning result for the candidate electronic shelf label.

An ordinary person skilled in the art understands that all or part of the processes in the methods of the above embodiments may be implemented by instructing the relevant hardware through a computer program, the program may be stored in a non-volatile computer-readable storage medium, and execution of the program may implement, for example, the processes of the embodiments of the above methods. Any reference to the memory, storage, database or other media used in the embodiments provided in the present application may include a non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache. As an explanation rather than a limitation, RAM is available in a variety of forms, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM), etc.

It should be noted that the relational terms used herein, such as "first" and "second", are used solely to distinguish one entity or operation from another, and do not necessarily require or imply any such actual relationship or sequence between those entities or operations. Further, the term "comprise", "include" or any other variation thereof is intended to cover non-exclusive inclusion so that a process, a method, an article or a device comprising a series of elements comprises not only those elements, but also other elements that are not explicitly listed, or that are inherent to such process, method, article or device. Where no further limitation is given, the element defined by the statement "comprises a . . . " does not preclude the existence of other identical elements in the process, method, article or device that includes the elements.

What is claimed is:

1. A positioning method for an electronic shelf label, comprising:
   calculating, by a server, a positioning result for each position-unknown electronic shelf label by using coordinate information of position-known electronic shelf labels and obtaining a candidate electronic shelf label with a fuzzy positioning result and a plurality of matching electronic shelf labels that match with the candidate electronic shelf label, based on a neighbor weight table of all shelf labels in a same store, wherein the plurality of matching electronic shelf labels comprise neighboring shelf labels of the candidate electronic shelf label, wherein the neighboring shelf labels have known positions and are located on different shelves or in different rows;
   pairing, by the server, the candidate electronic shelf label respectively with the plurality of matching electronic shelf labels to obtain a plurality of candidate-matching shelf label pairs, wherein each candidate-matching shelf label pair sequentially executes a distance measurement task to obtain a measured distance between the candidate electronic shelf label and each matching electronic shelf label; and
   determining, by the server, an actual positioning result for the candidate electronic shelf label by revising the fuzzy positioning result of the candidate electronic shelf label based on all measured distances.

2. The positioning method for an electronic shelf label according to claim 1, further comprising:
   sequentially sending, by the server, a distance measurement instruction to each candidate-matching shelf label pair through a base station, wherein each candidate-matching shelf label pair sequentially executes the distance measurement task according to the distance measurement instruction to obtain the measured distance between the candidate electronic shelf label and each matching electronic shelf label.

3. The positioning method for an electronic shelf label according to claim 2, wherein sequentially sending the distance measurement instruction to each candidate-matching shelf label pair through the base station comprises:
   in response to determining that the matching electronic shelf label in a current candidate-matching shelf label pair and the candidate electronic shelf label are registered in a same target base station, sending, by the server, the distance measurement instruction to the candidate electronic shelf label and the matching electronic shelf label at the same time through the target base station; and sending, by the server, the distance measurement instruction to a next candidate-matching shelf label pair, upon receiving a measured distance of the current candidate-matching shelf label pair.

4. The positioning method for an electronic shelf label according to claim 3, further comprising:

in response to determining that the matching electronic shelf label in the current candidate-matching shelf label pair and the candidate electronic shelf label are registered in two different base stations, sending, by the server, the distance measurement instruction to the candidate electronic shelf label and the matching electronic shelf label at the same time through the two base stations.

5. The positioning method for an electronic shelf label according to claim 4, wherein the distance measurement instruction comprises any of followings:

IDs of two shelf labels to be measured for a distance, identities of the two shelf labels, a distance measurement start time, a frequency point range used in the distance measurement, a duration for a measurement signal transmission, signal transmission power, a reception time-window length, a duration for a single measurement, or a number of times of measurement.

6. The positioning method for an electronic shelf label according to claim 3, further comprising:

in response to determining that the matching electronic shelf label in the current candidate-matching shelf label pair and the candidate electronic shelf label are registered in two different base stations, sending, by the server, a re-registration instruction to the matching electronic shelf label, so that the matching electronic shelf label is re-registered to a target base station in which the candidate electronic shelf label is registered; and sending, by the server, the distance measurement instruction to the candidate electronic shelf label and the matching electronic shelf label at the same time through the target base station.

7. The positioning method for an electronic shelf label according to claim 1, wherein each candidate-matching shelf label pair sequentially executes the distance measurement task to obtain the measured distance between the candidate electronic shelf label and each matching electronic shelf label comprises:

a candidate electronic shelf label in the current candidate-matching shelf label pair sends an i-th measurement signal using a center-frequency point $f_i$, and a matching electronic shelf label in the current candidate-matching shelf label pair records a phase $\varphi_{Ri}$ of the i-th measurement signal;

the matching electronic shelf label in the current candidate-matching shelf label pair carries the phase $\varphi_{Ri}$ in an i-th response signal and sends the i-th response signal using the center-frequency point $f_i$, and the candidate electronic shelf label in the current candidate-matching shelf label pair records a phase $\varphi_{fi}$ of the i-th response signal; and in response to the candidate electronic shelf label recording a phase $\varphi_{fN}$ of an N-th response signal sent by the matching electronic shelf label, the candidate electronic shelf label calculates the measured distance between the candidate electronic shelf label and the matching electronic shelf label in the current candidate-matching shelf label pair based on the center-frequency point $f_i$, the phase $\varphi_{Ri}$ and the phase $\varphi_{fi}$;

wherein $f_i$ is an arithmetic progression, i=a positive integer of [1, 2, . . . , N], wherein N is a preset total number of times of measurement signal transmission.

8. The positioning method for an electronic shelf label according to claim 7, the candidate electronic shelf label in the current candidate-matching shelf label pair calculates the measured distance between the candidate electronic shelf label and the matching electronic shelf label in the current candidate-matching shelf label pair based on the center-frequency point $f_i$, the phase $\varphi_{Ri}$ and the phase $\varphi_{fi}$ comprises that the candidate electronic shelf label in the current candidate-matching shelf label pair:

obtains a phase difference $\varphi_i$ based on the phase $\varphi_{Ri}$ and the phase $\varphi_{fi}$;

performs linear fitting of the phase difference $\varphi_i$ and the center-frequency point $f_i$ to obtain a slope of curve; and calculates the measured distance between the candidate electronic shelf label and the matching electronic shelf label in the current candidate-matching shelf label pair based on the slope of curve.

9. The positioning method for an electronic shelf label according to claim 8, wherein a formula for calculating the measured distance between the candidate electronic shelf label and the matching electronic shelf label in the current candidate-matching shelf label pair based on the slope of curve is:

$$d_1 = k\frac{c}{\pi}$$

where $d_1$ is the measured distance between the candidate electronic shelf label and the matching electronic shelf label in the current candidate-matching shelf label pair, k is the corresponding transmission delay obtained by dividing the slope of curve by an integer multiple relationship, and c is the speed of light.

10. The positioning method for an electronic shelf label according to claim 7, wherein the candidate electronic shelf label in the current candidate-matching shelf label pair calculates the measured distance between the candidate electronic shelf label and the matching electronic shelf label in the current candidate-matching shelf label pair based on the center-frequency point $f_i$, the phase $\varphi_{Ri}$ and the phase $\varphi_{fi}$ comprises the candidate electronic shelf label in the current candidate-matching shelf label pair:

obtains a phase difference $\varphi_i$ based on the phase $\varphi_{Ri}$ and the phase $\varphi_{fi}$;

performs autocorrelation processing and fast Fourier transform on the phase difference $\varphi_i$ to extract a data coordinate $m(i_{max})$ corresponding to a maximum feature point; and calculates the measured distance between the candidate electronic shelf label and the matching electronic shelf label in the current candidate-matching shelf label pair based on the data coordinate.

11. The positioning method for an electronic shelf label according to claim 10, wherein a formula for calculating the measured distance between the candidate electronic shelf label and the matching electronic shelf label in the current candidate-matching shelf label pair based on the data coordinate is:

$$d_2 = d_{max} \cdot m(A_{max}) + d_{offset}$$

where $d_2$ is the measured distance between the candidate electronic shelf label and the matching electronic shelf label in the current candidate-matching shelf label pair, $$d_{max} = \frac{c}{4\Delta f},$$

where $\Delta f$ is a difference between two adjacent frequency points, $d_{offset}$ is a distance error caused by internal circuits of the shelf labels, and $m(A_{max})$ is a normalized value of the data coordinate $m(i_{max})$.

12. The positioning method for an electronic shelf label according to claim 1, wherein determining the actual positioning result for the candidate electronic shelf label by revising the fuzzy positioning result of the candidate electronic shelf label based on all the measured distances comprises:
  grouping the plurality of matching electronic shelf labels according to at least one of a same row or a same shelf to obtain at least two electronic shelf label groups;
  obtaining a target electronic shelf label group with the smallest measured distance in the two electronic shelf label groups based on all the measured distances between the candidate electronic shelf label and all the matching electronic shelf labels;
  taking at least one of a row or a shelf corresponding to the target electronic shelf label group as at least one of a target row or a target shelf of the candidate electronic shelf label; and
  determining the actual positioning result for the candidate electronic shelf label by fusing the at least one of the target row or the target shelf of the candidate electronic shelf label with the fuzzy positioning result.

13. The positioning method for an electronic shelf label according to claim 1, wherein determining the actual positioning result for the candidate electronic shelf label by revising the fuzzy positioning result of the candidate electronic shelf label based on all the measured distances comprises:
  grouping the plurality of matching electronic shelf labels according to at least one of a same row or a same shelf to obtain at least two electronic shelf label groups;
  obtaining a target electronic shelf label group with the smallest average measured distance in the two electronic shelf label groups based on all the measured distances between the candidate electronic shelf label and all the matching electronic shelf labels;
  taking at least one of a row or a shelf corresponding to the target electronic shelf label group as at least one of a target row or a target shelf of the candidate electronic shelf label; and
  determining the actual positioning result for the candidate electronic shelf label by fusing at least one of the target row or the target shelf of the candidate electronic shelf label with the fuzzy positioning result.

14. The positioning method for an electronic shelf label according to claim 1, wherein calculating the positioning result for each position-unknown electronic shelf label by using coordinate information of the position-known electronic shelf labels and obtaining the candidate electronic shelf label with the fuzzy positioning result, based on the neighbor weight table of all the shelf labels in the same store comprises:
  sending, by the server, a full-field positioning message to all base stations, so that the base stations broadcast to notify all the electronic shelf labels to arbitrarily send identity information at a predetermined time-window, a predetermined frequency point and predetermined transmission power, and to continuously receive identity information, signal strength and number of times of receptions sent by other electronic shelf labels, so as to obtain the neighbor weight table of all electronic shelf labels in the same store;
  calculating the positioning result for each position-unknown electronic shelf label based on the coordinate information of the position-known electronic shelf labels in the neighbor weight table;
  obtaining at least two weight sums corresponding to all neighbor shelf labels of each electronic shelf label in different rows or on adjacent shelves based on the neighbor weight table; and
  taking an electronic shelf label for which a weight difference between the at least two weight sums falls within a predetermined threshold range as the candidate electronic shelf label, and taking the positioning result of the candidate electronic shelf label as the fuzzy positioning result.

15. The positioning method for an electronic shelf label according to claim 14, wherein calculating the positioning result for each position-unknown electronic shelf label based on the coordinate information of the position-known electronic shelf labels in the neighbor weight table comprises:
  constructing a network graph showing a communication relationship between all position-unknown electronic shelf labels and all position-known electronic shelf labels based on the neighbor weight table;
  obtaining a path value between each position-unknown electronic shelf label and each position-known electronic shelf label based on the neighbor weights in the network graph; and
  obtaining the positioning result for each position-unknown shelf label based on two smallest path values and coordinate information of two position-known electronic shelf labels corresponding to the two smallest path values.

16. The positioning method for an electronic shelf label according to claim 15, wherein the path value between two adjacent electronic shelf labels=(1/(a neighbor weight of a second electronic shelf label received by a first electronic shelf label+a neighbor weight of the first electronic shelf label received by the second electronic shelf label)).

17. The positioning method for an electronic shelf label according to claim 14, wherein the neighbor weight is the number of times that one electronic shelf label receives identity information sent by another electronic shelf label within a limited time slice;
  the neighbor weight is the signal strength at which one electronic shelf label receives identity information sent by another electronic shelf label within a limited time slice; or
  the neighbor weight is a weighted average of the signal strength and the number of times that one electronic shelf label receives identity information sent by another electronic shelf label within a limited time slice.

18. A computer device, comprising:
  a memory, a processor, and a computer program stored on the memory and executable on the processor, wherein the processor is configured to implement acts comprising:
  calculating a positioning result for each position-unknown electronic shelf label by using coordinate information of position-known electronic shelf labels and obtaining a candidate electronic shelf label with a fuzzy positioning result and a plurality of matching electronic shelf labels that match with the candidate electronic shelf label, based on a neighbor weight table of all shelf labels in a same store, wherein the plurality of matching electronic shelf labels comprise neighboring shelf labels of the candidate electronic shelf label, wherein the neighboring shelf labels have known positions and are located on different shelves or in different rows;

pairing the candidate electronic shelf label respectively with the plurality of matching electronic shelf labels to obtain a plurality of candidate-matching shelf label pairs, wherein each candidate-matching shelf label pair sequentially executes a distance measurement task to obtain a measured distance between the candidate electronic shelf label and each matching electronic shelf label; and determining an actual positioning result for the candidate electronic shelf label by revising the fuzzy positioning result of the candidate electronic shelf label based on all measured distances.

19. The computer device according to claim 18, wherein the processor is configured to implement acts further comprising sequentially sending a distance measurement instruction to each candidate-matching shelf label pair through a base station, wherein each candidate-matching shelf label pair sequentially executes the distance measurement task according to the distance measurement instruction to obtain the measured distance between the candidate electronic shelf label and each matching electronic shelf label.

20. A non-transitory computer readable storage medium storing a plurality of programs for execution by a computer device having a processor, wherein the plurality of programs, when executed by the processor, cause the computer device to perform acts comprising:

calculating a positioning result for each position-unknown electronic shelf label by using coordinate information of position-known electronic shelf labels and obtaining a candidate electronic shelf label with a fuzzy positioning result and a plurality of matching electronic shelf labels that match with the candidate electronic shelf label, based on a neighbor weight table of all shelf labels in a same store, wherein the plurality of matching electronic shelf labels comprise neighboring shelf labels of the candidate electronic shelf label, wherein the neighboring shelf labels have known positions and are located on different shelves or in different rows;

pairing the candidate electronic shelf label respectively with the plurality of matching electronic shelf labels to obtain a plurality of candidate-matching shelf label pairs, wherein each candidate-matching shelf label pair sequentially executes a distance measurement task to obtain a measured distance between the candidate electronic shelf label and each matching electronic shelf label; and determining an actual positioning result for the candidate electronic shelf label by revising the fuzzy positioning result of the candidate electronic shelf label based on all measured distances.

\* \* \* \* \*